Patented Dec. 30, 1952

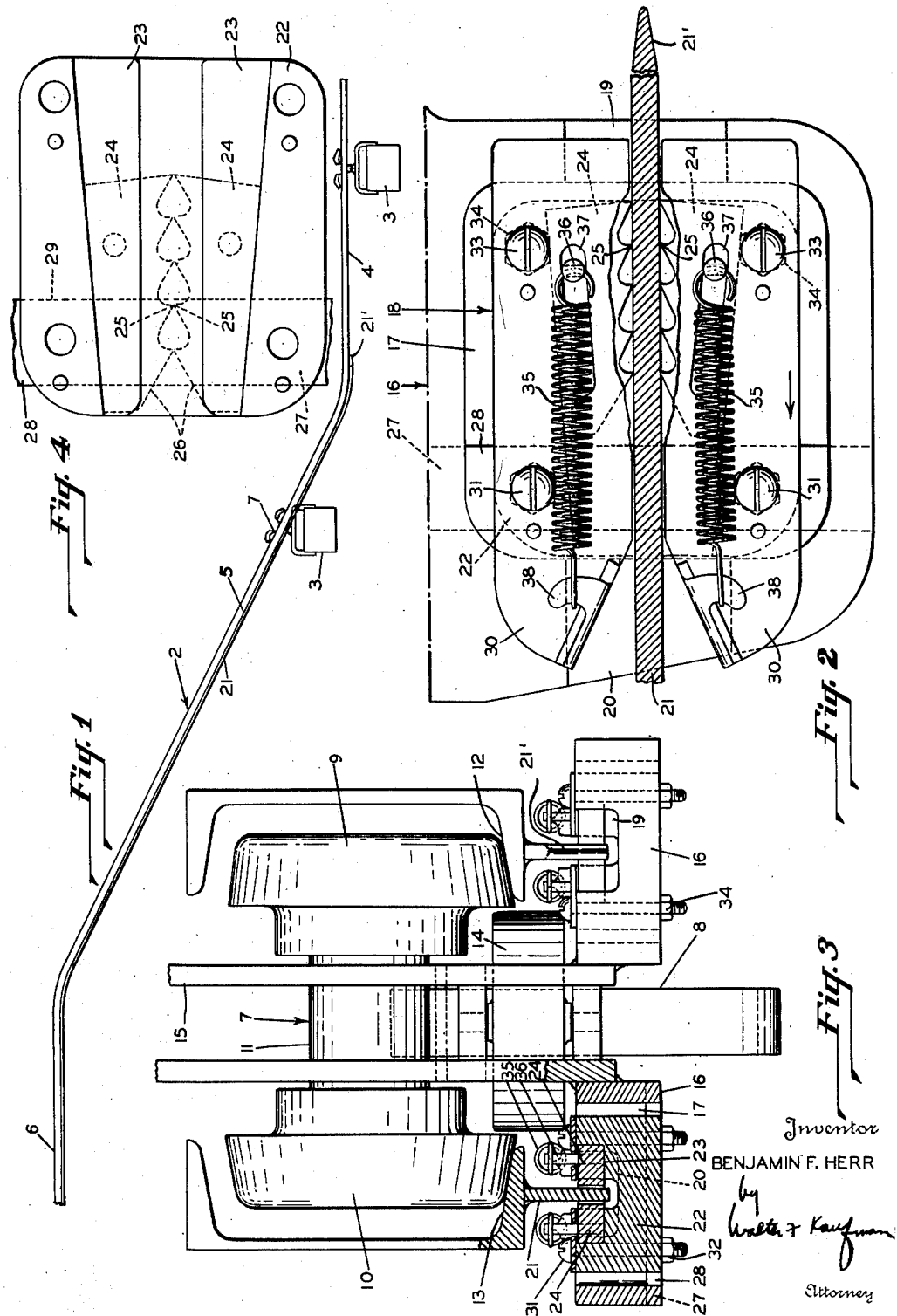

2,623,614

UNITED STATES PATENT OFFICE 2,623,614

SAFETY DEVICE FOR CONVEYERS OR THE LIKE

Benjamin F. Herr, Lancaster, Pa., assignor to Armstrong Cork Company, Lancaster, Pa., a corporation of Pennsylvania Application June 28, 1949, Serial No. 101,763

9 Claims. (Cl. 188—42)

This invention relates to a safety device for conveyors and the like, and is concerned particularly with a safety device for use in combination with a chain conveyor for moving receptacles of large capacity up an incline.

Where inclined conveyors are used there is always a hazard involved in the event of breakage of the chain or the driving lug which engages the receptacle carriage to impart movement to it as the chain travels along the conveyor trackway. Failure of the lug-engaging mechanism of the carriage to properly engage the lug on the chain also may result in a "run away" carriage. Where the conveyor receptacle is of large size and may contain material of great weight, as in the linoleum industry where inclined conveyors are employed for the transportation of linoleum mix from a lower level to an upper level with the use of an inclined conveyor, the problem is serious.

A loaded conveyor bucket and carriage may weigh a ton or more; and in the event of failure of the conveyor system permitting the carriage to roll unimpeded down an inclined trackway, great damage may result to the conveyor system and the manufacturing building and equipment, and personnel may be injured or killed. The problem is aggravated where a series of buckets are released upon a chain break.

An object of the invention is to provide a safety device for carriage-type conveyors which will operate automatically to lock the conveyor carriage against rearward movement.

Another object of the invention is to provide a multiple-type safety device, each component of which is capable of arresting movement of the conveyor carriage.

A further object of the invention is to provide a safety device for conveyors which will not affect the normal operation of the system to any measurable extent but will be capable of arresting movement of the carriage in the event of failure of the conveyor.

An additional object of the invention is to provide a conveyor safety device which will accommodate itself automatically to any lateral movement of the conveyor carriage.

According to this invention the safety device comprises a gripping arrangement movable with the conveyor carriage and engageable with a rail associated with the trackway for the carriage. The gripping arrangement permits the carriage to move forward without restriction, but all rearward movement of the carriage is arrested. The safety device is operable at all times whether the carriage be loaded with a filled container and whether the carriage be in motion or at rest. The rail need not extend throughout the whole of the conveyor system; in fact it generally will be provided only at inclines in the trackway and portions of the trackway adjacent to the inclines. This permits manipulation of the carriages at horizontal runs of the trackway where loading and unloading of the carriages and their receptacles may be effected. The safety device is arranged to automatically engage and disengage the rail.

In order that the invention may be readily understood, a typical embodiment will be described in conjunction with the attached drawing, in which:

Figure 1 is a schematic view illustrating an inclined conveyor system incorporating the safety arrangement of the present invention;

Figure 2 is a top plan view partially in section illustrating the device in gripping position;

Figure 3 is an end elevation also partially in section showing a movable safety device of the type shown in Figure 2 but to a somewhat smaller scale; and Figure 4 is a top plan view of the safety device gripper body with the gripper jaws shown in dotted lines.

In Figure 1 there is shown a conveyor system 2 which includes a plurality of receptacles 3 adapted to be moved along a pathway defined by tracks 4, 5, and 6, the portion 5 being inclined and the portions 4 and 6 constituting horizontal runs. For example, the section 4 may be at one level, say the ground floor level, and section 6 at another level, say the second floor level, with the inclined section 5 disposed between the two levels.

The mechanism for moving the buckets along the conveyor trackway may be of any type, such as the chain systems now extensively used, in which the chain is provided with driving lugs which are moved with the chain over a path to coincide with the path of the conveyor track; and the receptacles to be conveyed are mounted on carriages which are provided with automatically operable latches engaged by the lugs on the chain and moved thereby. Other types of conveyors may be used. The present invention is applicable to all types and is especially useful where the receptacle and its carriage move up an inclined trackway. The invention will be useful, however, in systems where the carriage moves in a horizontal plane but where it is desirable to have the carriage movement limited to a single direction.

In the embodiment illustrated, the receptacles 3 are mounted on carriages shown in Figure 3 and indicated generally by the numeral 7. A pivot bar 8 is secured to the carriage 7, and the receptacle 3 is pivoted thereto so that it will ride in a horizontal position regardless of the inclination of the carriage. The mechanism for imparting motion to the carriage along the trackway has not been shown in Figure 3 since it constitutes no part of the present invention. If a chain type of conveyor is used with projecting lugs, a latching arrangement such as generally indicated in Figure 1 may be provided on the carriage 7 for engagement by one of the lugs to effect movement of the carriage along the trackway. The same is true of the receptacle support and the design and the construction of the receptacle itself. The device of the present invention will be useful with all types of carriages, receptacles, and receptacle supports. A typical carriage structure has been shown in Figure 3 to illustrate the application of the present invention to a type of carriage commercially available.

Referring to Figure 3, it will be observed that the carriage 7 includes wheels 9 and 10 which are mounted for rotation on an axle 11. The wheels 9 and 10 ride upon tracks 12 and 13 which are in the form of spaced channels constituting part of the conveyor system 2 of Figure 1, for example. A lateral guide wheel 14 is provided on the carriage to limit lateral movement thereof by engagement of the wheel 14 with the longitudinal lower edges of the tracks 12 and 13. Such limited lateral movement is permitted to avoid wear and binding, particularly under heavy swinging loads.

Suspended from the carriage 7 by supports 15 is a pair of holders 16, one of left-hand formation and one of right-hand formation as seen in Figure 3. The holders 16 are preferably fabricated and then welded to the supports 15.

Referring to Figures 2 and 3, in which Figure 2 illustrates the left-hand holder of Figure 3 and its associated gripping mechanism, and Figure 3 illustrates both the right-hand and left-hand holders, the left-hand holder being in section and the right-hand holder being in elevation, one of the holders and associated gripping mechanism will be described. Both are of the same general construction as will be clear from an examination of Figure 3. Holder 16 is provided with a central opening 17 for the reception of a gripper assembly indicated generally at 18. The opening 17 is large enough to permit lateral shifting of the gripper assembly 18 as the carriage moves laterally on its trackway, as will be more fully described. The holder 16 is slotted at 19 and 20 to permit the free passage of the device along the path of a rail 21 welded to the track 13. In the system illustrated in Figure 1 the rail 21 is provided in the inclined portion 5 of the trackway and a portion of the horizontal run 6 which extends from the top of the inclined portion of the trackway.

Each gripper assembly 18 includes a gripper body block 22 which is shown in top plan in Figure 4 and is shown in section in Figure 3. The gripper body block is provided with a pair of ways 23 which are milled into the block. These ways 23 converge as shown in Figure 4. Gripper jaws 24 are mounted in the ways 23 and are slidable therealong. The gripper jaws are shown in dotted lines in Figure 4 in a position with teeth 25 of the jaws 24 in engagement. This illustrates that the jaws may move toward one another along the inclined ways 23 to a position where the teeth engage, but normally the teeth are spaced apart by the rail 21 when the device is in operation, as shown in Figure 3. The jaws 24 are each inclined at their leading edges as indicated at 26 to provide automatic entrance of the device into position, with the jaws disposed on opposite sides of the rail 21. The end 21' of the rail 21 as shown in Figure 2 may also be tapered so as to facilitate easy entrance of the device into position to engage the rail.

The holder 16 is slotted as indicated at 27 in Figure 2 and Figure 3 to provide a way in which a lower mounting plate 28 may slide. The gripper body block 22 is recessed as shown at 29 to receive the lower mounting plate 28. Upper mounting plates 30 extend longitudinally of the holder 16 and overlie a portion of the upper surface of the holder, spanning the opening 17 therein as shown in Figure 2. Bolts 31 pass through the upper mounting plates 30 and the gripper body block 22 and are threaded into the lower mounting plate 28. The bolts 31 are drawn up until the upper mounting plates 30 and the lower mounting plate 28 properly engage the holder 16 to permit lateral movement of the gripper assembly 18, such movement being guided by the lower mounting block 28 which slides in the way 27. Lock nuts 32 hold the bolts 31 in their desired position. Other bolts 33 pass through the upper mounting plates 30 and the gripper body block 22, and nuts 34 clamp the upper mounting plate and body block together. This construction permits the gripper body block and its associated gripping mechanism to move laterally with respect to the holder 16. Thus the gripper assembly is always in operative position with respect to its stationary rail, regardless of any lateral shifting of the carriage on its trackway and regardless of any distortion of the rail which may occur under heavy loading of the conveyor or in fabrication of the system.

The forward ends of the upper mounting plates 30 are inclined inwardly toward the jaws 24 and constitute a centering device which brings the gripper assembly 18 in proper alignment with the rail 21. Thus there is only a minor movement of the jaws 24 necessary to bring them into proper position embracing the rail on opposite sides thereof.

The gripper jaws 24 are normally held in operative position by springs 35, one spring being provided for each of the jaws. Each jaw is provided with a pin 36 which projects upwardly through a slot 37 provided in the upper mounting plates 30. Each of pins 36 is drilled to provide an opening for the reception of one end of its actuating spring, and the opposite end is secured to an ear 38 formed on the mounting plate 30. Thus the springs 35 tend to move the jaws toward one another and into firm engagement with the rail 21. It will be observed that the teeth 25 of the jaws 24 are directed away from the normal direction of travel of the carriage and the safety mechanism associated with it, such direction being indicated by the arrow in Figure 2. Thus, should the carriage become disengaged from the conveying mechanism while the carriage is in any portion of the conveyor provided with the rail 21, as shown in Figure 1 for example, rearward movement of the carriage along the trackway will be arrested; for such rearward movement will cause the teeth 25 to engage the rail 21 in a firm manner and the weight of the carriage and its receptacle and contents will tend to move the jaws along the ways 23, causing the teeth to more firmly grip the rail. Any motion opposite to the direction of the arrow shown in Figure 2 will result in locking of the safety device onto the rail 21 whether the carriage be in an inclined position or not. Thus, for example, should the carriage be in the portion 6 of the system shown in Figure 1 and in a substantially horizontal position at the time of failure of the conveyor or its driving lug, it will not be possible for a workman to inadvertently move the carriage and its receptacle in a direction toward the inclined portion 5 of the trackway.

While normally one safety device is all that is required for each carriage, two may be used as shown in Figure 3; and in the event of failure of one the other will be available. Each is adequate to arrest movement of the carriage. While it is preferred to have two jaws on each gripper, one may be omitted; and a flat or serrated guiding surface may be provided for engagement with the rail 21 opposite the movable jaw. For example, the gripper jaw 24 shown on the right-hand side of rail 21 in Figure 3 may be fixed, and the jaw 24 to the left of the rail 21 may be movable and relied upon to effect the necessary gripping action. It is preferred, of course, to use two gripping jaws, both moving along inclined surfaces toward a point of convergence. Other types of gripping arrangements including ball grip and eccentrics may be used; and certain features of the invention, such as the arrangement for lateral shifting of the gripper assembly, will be as useful with one type as another.

While I have illustrated and described a preferred embodiment of the invention, it will be understood the same is not limited thereto but may be otherwise embodied and practiced within the scope of the following claims.

I claim:

1. In a conveyor system or the like, the combination of: a carriage movable along a trackway, a rail disposed along said trackway and fixed with respect thereto, means for gripping said rail upon movement of said carriage in one direction along said trackway, and means for mounting said gripping means for movement with said carriage, said mounting means comprising a holder attached to the carriage and a slide supporting said gripping means for limited lateral relative movement between said gripping means and holder, whereby lateral shifting of said carriage will not affect the action of said gripping means.

2. In a conveyor system or the like, the combination of: a carriage movable along a trackway, a rail disposed along said trackway and fixed with respect thereto, means for gripping said rail upon movement of said carriage in one direction along said trackway to arrest the movement of said carriage in such direction, said carriage being free for limited lateral shifting on said trackway, a holder for said gripping means carried by said carriage, and guiding means on said holder for adjusting the position of said gripping means with respect to said rail upon lateral shifting of said carriage.

3. In a conveyor system or the like, the combination of: a carriage movable along a trackway and subject to limited lateral shifting with respect thereto as it moves therealong, a rail disposed along said trackway and fixed with respect thereto, means for gripping said rail upon movement of said carriage in one direction along said trackway, a holder for said gripping means carried by said carriage and movable therewith, and a slide to which said gripping means is attached, said slide being mounted in said holder for limited lateral movement of said slide with respect to said holder upon lateral shifting of said carriage and holder.

4. In a conveyor system or the like, the combination of: a carriage movable along a trackway and subject to limited lateral shifting with respect thereto as it moves therealong, a rail disposed along said trackway and fixed with respect thereto, means for gripping said rail upon movement of said carriage in one direction along said trackway to arrest the movement of said carriage in such direction, and means for slidably mounting said gripping means for movement with said carriage along said trackway in constantly aligned position with respect to said fixed rail regardless of lateral shifting of said carriage.

5. In a conveyor system or the like, the combination of: a carriage movable along a trackway and subject to limited lateral shifting with respect thereto as it moves therealong, a rail disposed along said trackway and fixed with respect thereto, means for gripping said rail upon movement of said carriage in one direction along said trackway to arrest the movement of said carriage in such direction, a holder for said gripping means movable with said carriage, and means for shiftably mounting said gripping means on said holder comprising a slide movable laterally with respect to the path of movement of said carriage along said pathway in a way provided in said holder, a mounting plate slidably engaging said holder, and means for clamping said gripping means between said slide and mounting plate for slidable movement of said gripping means with respect to said holder.

6. In a conveyor system or the like, the combination of: a carriage movable along a trackway, a rail disposed along a portion only of said trackway and fixed with respect thereto, means for gripping said rail upon movement of said carriage in one direction along said trackway to arrest the movement of said carriage in such direction, a holder for said gripping means attached to said carriage, means for mounting said gripping means for limited lateral movement with respect to said holder, and guiding means attached to said gripping means and engageable with said rail to laterally shift said gripping means and align the same with said rail.

7. In a conveyor system or the like, the combination of: a pair of spaced tracks constituting a trackway, a carriage mounted on rollers for movement on said tracks along said trackway, said carriage being free for limited lateral shifting on said tracks, a pair of rails depending from said tracks, means for gripping each of said rails upon movement of said carriage in one direction along said trackway, and means for mounting said gripping means on said carriage for independent lateral movement with respect to said carriage, whereby lateral shifting of the carriage will not affect the action of said gripping means.

8. In a conveyor system or the like, the combination of: a trackway, a portion of which is inclined to the horizontal; a carriage movable along said trackway, a rail disposed along a portion only of said trackway including said inclined portion thereof; means for gripping said rail upon movement of said carriage in one direction along said trackway to arrest the movement of said carriage in such direction; means for automatically positioning said gripping means with respect to said rail comprising a pair of guides having an opening therebetween for the reception of said rail and having tapered leading surfaces for engagement with said rail to direct the gripping device into position with said rail disposed within said opening; gripper jaws disposed below said guides for engagement with said rail, said jaws each being provided with tapered leading surfaces for engagement with said rail to position said jaws on opposite sides of said rail; and yielding means for drawing said jaws into engagement with said rail.

9. In a conveyor system or the like, the combination of claim 1 in which the means for gripping the rail comprises a gripper body having a pair of spaced ways formed therein, said ways converging toward the leading portion of said gripper body in the direction of travel of the body along said fixed rail, a pair of wedge-shaped gripper jaws mounted for sliding movement along said ways with rail-engaging surfaces on said jaws lying in engagement with said rail in all positions of movement of said gripping means with respect to said fixed rail, movement of said jaws toward the leading portion of the gripper body decreasing the distance between said rail-engaging surfaces, confining plates engaging said jaws and holding the same in said ways, means for slidably mounting said gripper body for limited lateral movement with respect to said fixed rail to align said jaws with said fixed rail, and means for biasing said jaws independently into engagement with said rail.

BENJAMIN F. HERR.

REFERENCES CITED

The following references are of record in the file of this patent:

UNITED STATES PATENTS

| Number | Name | Date |
|---|---|---|
| 699,024 | Schenk | Apr. 29, 1902 |
| 1,486,922 | Ross | Mar. 18, 1924 |
| 1,608,392 | Hannah | Nov. 23, 1926 |
| 1,882,878 | Plyler | Oct. 18, 1932 |
| 2,054,716 | Stedefeld et al. | Sept. 15, 1936 |
| 2,150,630 | Piron | Mar. 14, 1939 |